United States Patent [19]
Kaufmann

[11] 3,841,119
[45] Oct. 15, 1974

[54] BICYCLE SECURING DEVICE

[76] Inventor: Edward A. Kaufmann, 2785 N. Speer Blvd., Denver, Colo. 80211

[22] Filed: Apr. 9, 1973

[21] Appl. No.: 349,489

[52] U.S. Cl. ............... 70/58, 70/233, 211/17, 70/DIG. 57
[51] Int. Cl. ............... A47f 7/00, E05b 73/00
[58] Field of Search ........... 70/14, 57, 58, 233, 234, 70/235, DIG. 57; 211/22, 17, 5; 248/203

[56] References Cited
UNITED STATES PATENTS

| | | | |
|---|---|---|---|
| 512,548 | 1/1894 | Hurlbut | 211/17 |
| 2,329,088 | 9/1943 | Schram | 211/17 |
| 2,873,034 | 2/1959 | Laing | 211/17 |
| 3,101,695 | 8/1963 | Honeyman | 70/57 X |

FOREIGN PATENTS OR APPLICATIONS

| | | | |
|---|---|---|---|
| 1,050,698 | 9/1953 | France | 70/58 |
| 148,704 | 8/1920 | Great Britain | 70/58 |
| 618,021 | 2/1949 | Great Britain | 70/58 |
| 559,043 | 9/1932 | Germany | 70/234 |

Primary Examiner—Robert L. Wolfe
Attorney, Agent, or Firm—Richard D. Law

[57] ABSTRACT

A bicycle securing assembly including a bicycle support rack having an elongated single member elevated from the ground and having a plurality of U-shaped attachment loops fixedly suspended from said member at spaced locations. A lockable securing device is fixedly attached to the forward portion of the frame of a bicycle for engaging an attachment loop on said support rack. The securing device includes a pair of forwardly extending spaced arms for receiving the attachment loop and a lockable arrangement for enclosing the attachment means to prevent the removal of the bicycle from the support rack. Various locking devices are provided such as a bicycle lock extending through the ends of the spaced arms or an internal lockable latch mounted within the body of the securing device for enclosing the attachment means within the extended arms.

18 Claims, 6 Drawing Figures

PATENTED OCT 15 1974    3,841,119

BICYCLE SECURING DEVICE

This invention is directed to a securing assembly for preventing the unauthorized removal of a bicycle and more specifically is directed to an assembly having a securing device attached to the frame of a bicycle to engage a bicycle support rack.

As the use of bicycles in both the United States and elsewhere in the world increases, the theft of these bicycles also has substantially increased. The present conventional bicycle locks include spoke padlocks, cable and locking devices, chain and padlock devices, etc. All of these devices are directed towards the prevention of riding the bicycle when the lock is in place. Normally these types of devices merely lock one of the wheels of the bicycle to a portion of the frame to immobilize it. In other cases, the chain or cable is interwound through the wheels and frame of the bicycle and is attached to an immovable object to prevent the unauthorized removal of the bicycle.

As is now well known, these types of devices are able to generally discourage the tampering or removal by amateur or juvenile would-be thieves. In the long run, however, these types of devices mean nothing to a so-called professional thief who operates usually with sophisticated metal cutters and vehicles such as pickup trucks to rapidly sever the locking device and then remove the bicycle from the so-called secure location. Invariably they use cutting devices which can easily sever the relatively soft chains or cables that have been used in the past. In addition the present locking devices fail to discourage the dishonest element in our society from hauling away, where possible, the locked bicycle to a secluded area where the locking device may be removed in a more sophisticated manner such as with an oxyacetylene cutting torch.

Because of the present deficiencies of the common locking devices presently used on bicycles the present invention has as an object to provide a bicycle securing assembly for attaching a bicycle to an anchored support to render it immovable from the support.

Another object of the present invention is to provide a bicycle securing assembly which deters severance of the bicycle from the support by means of ordinary cutting devices which are readily accessible.

A still further object of the present invention is to provide a bicycle securing assembly which can be readily and economically manufactured and used widespread to reverse the trend in bicycle thefts.

A further object of the present invention is to provide a bicycle securing assembly wherein the bicycle can be easily and quickly attached to or removed from the associated support by the authorized owner. In addition, the present invention provides a bicycle lock which can be easily attached to an existing bicycle or integrally formed as part of the frame of a newly manufactured bicycle.

A still further object of the present invention is to provide a bicycle locking and securing apparatus which can be cheaply manufactured for sale and use by the younger members of our population which encompasses the majority of the present users of bicycles.

Other features and objects of this invention will appear in the following description and appended claims, reference being made to the accompanying drawings forming a part of the specification wherein like reference characters designate corresponding parts in the several views.

Figure 1:
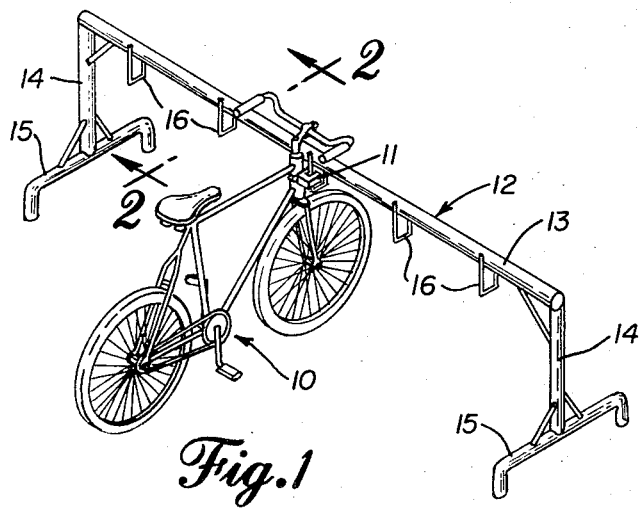
FIG. 1 is an isometric view showing a bicycle securely attached by means of a locking device to an immovable supporting rack according to the present invention.
Figure 2:
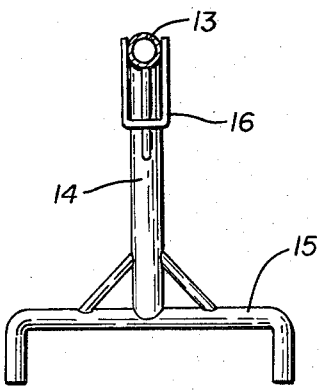
FIG. 2 is a sectional view of the bicycle supporting rack taken along the lines 2—2 of FIG. 1 and showing the support attaching element.
Figure 4:
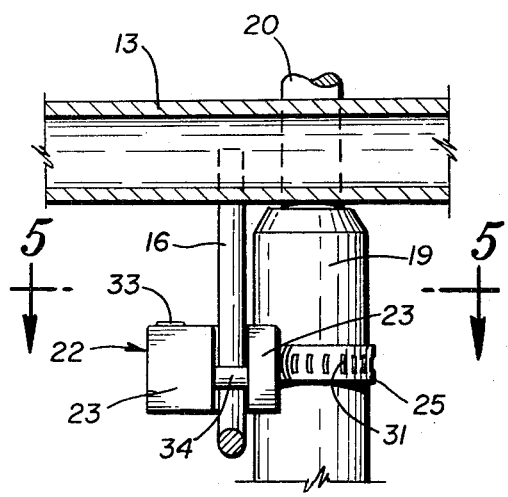
FIG. 4 is a partial sectional view showing the bicycle lock securing assembly in the engaged position taken along the lines 4—4 of FIG. 3.
Figure 3:
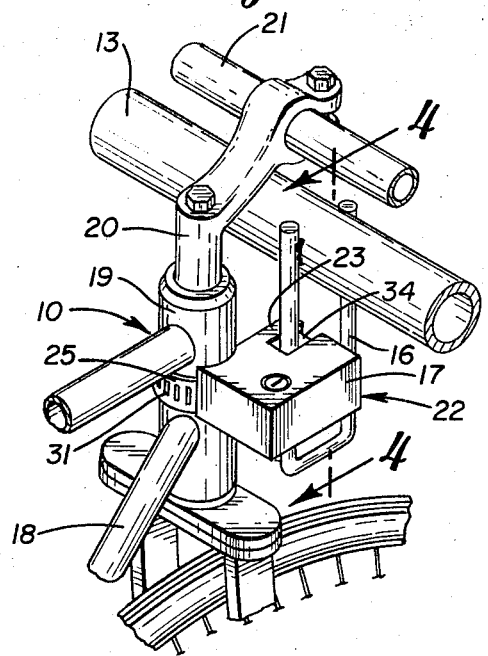
FIG. 3 is an enlarged isometric view showing the bicycle attached locking device securely engaged with the support rack.

Referring more specifically to the drawings, namely FIGS. 1 and 2, a bicycle 10 is shown attached by locking device 11 to a novel bicycle support rack 12. The rack 12 is formed from a single elongated tube or pipe member 13 and support legs 14. The bottom portion of the legs 14 can be terminated in the form of pedestal 15 or can be extended downwardly into the ground to be buried in a material such as concrete. If pedestal type legs 15 are to be used it is of advantage to form the support legs and pedestal legs and possibly the elongated member 13 from solid or filled structural materials to greatly increase the weight of the structure to prevent it from being moved or carried away.

Distributed along the support member 13 in generally even spaced fashion are a plurality of attachment members 16 suspended downwardly from the support member 13. These attachment members, as can be better seen in FIG. 2, can be arranged in a generally U-shaped configuration from solid or hollow rod stock. In the arrangement shown in FIG. 2, the attachment members are fixedly attached such as by welding the ends of each of the legs of the attachment members to opposite sides of the support member 13. The height at which the elongated member 13 is horizontally positioned above the supporting ground surface and the length of the attachment members 16 can be arranged to accommodate various size bicycles.

It is to be understood that the attaching member may take various forms, such as a single rod having a bulbous outer end and attached downwardly from the undersurface of the support member. It is also possible that the attaching member can be formed as an endless ring formed around the support member which can be fixedly positioned by welding to the upper surface of the member or allowed to slide freely along the length of the member 13. If the latter arrangement is used, it would be desirable to provide stops at each end of the support member 13 to prevent the rings from dropping downwardly over the support legs 14. Whatever the configuration of the attachment member 16 it is necessary that the material from which it is formed be capable of being hardened sufficiently to prevent cutting or severing be means of conventional type cutting devices such as hack saws or bolt cutters. Thus, the attachment members should be fabricated from high quality carbon steel or alloys while the remainder of the support rack can be formed from common materials providing sufficient structural rigidity.

As part of this invention, a lockable securing device 17 is provided for attachment to a portion of the frame 18 of the bicycle 10. The bearing housing 19 which forms the forward section of the frame 18 and provides support for the fork of the front wheel of the bicycle is a suitable location for attaching the lockable securing device 17. It is also possible that the securing device 17 may be attached to or formed as part of the gooseneck 20 to which the handlebars 21 are attached. Attachment of the lockable securing device 17 to the bearing housing 19 is probably more desirable since it is a rigid part of the entire frame 18 of the bicycle.

The lockable securing device 17 has a body 22 and two outwardly extending arms 23. An arcuate cutout 24 is provided along one side of the body 22. The cutout 24 is provided to allow the body 22 to conform to the generally cylindrical configuration of the bearing housing 19.

Figure 5:
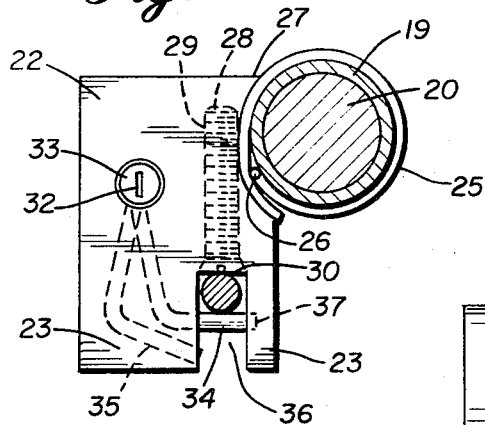
FIG. 5 is a top plan view of the bicycle attached locking device showing the lockable latch mechanism in dashed lines in the open position.
Figure 6:
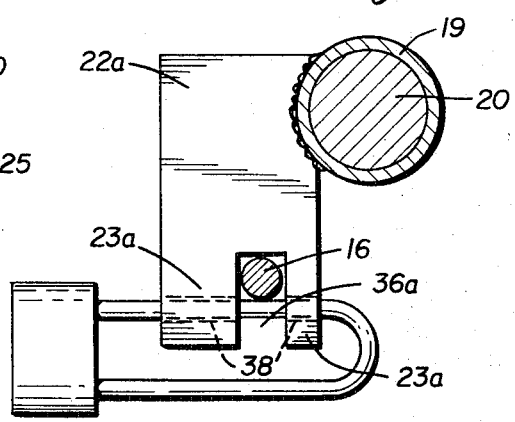
FIG. 6 is another embodiment of the bicycle attached locking device which includes a conventional lock for securing the lock device to the support element.

The lockable securing device 17 can be attached to the bearing housing 19 by any suitable method such as a tightenable strap as shown in FIG. 5, or by welding as shown in FIG. 6, or in the alternative it may be formed as an integral part of the housing which could be cast or forged as a one piece unit. In the tightenable strap embodiment a strap 25 attached to the body 22 at one end by means of pin 26 is arranged to extend outwardly and around the bearing housing 19. The opposite end 28 of the strap 25 is fed through an arcuate slot 27 which is arranged tangent to a bore 28 provided within the body 22. The bore 28 extends inwardly through the body 22 at the base 20 of the arms 23. A rotatable screw 29 having spiral threads engages a series of arcuate cutouts 31 provided in the strap 25. By rotating the screw 29 the threads engage the arcuate cutouts 31 allowing the strap to be tightened around the housing 19 to rigidly secure the lockable securing device 17 to the bicycle frame 18. With the head of the tightening screw 29 located in the base of the outstanding arms 23 the head 30 is concealed to prevent tampering when the securing device 17 is engaged with the attachment member 16.

A lock device 32 can be provided within the body 22 to enclose the slot 36 provided between the arms 23 to retain the attachment member 16 when inserted therebetween. In the embodiment shown in FIG. 5, a tumbler type lock cylinder is mounted within the body 22 for rotatable movement from an open position to a locked position. An L-shaped arm 34 is provided to extend outwardly from the cylindrical lock 33. The end portion 35 of the arm 34 is arranged to extend across the slot 36 provided between the arms 23 and to be inserted into the recess 37 provided in the opposite arm when the lock is in the closed position. When the lock is in the open position the outer end 35 of the L-shaped arm 34 is drawn into the body 22 to clear the slot 36 and permit easy removal or entrance of the attachment member 16. Thus a simple locking arrangement is provided whereby the attachment member 16 may be securely enclosed within the slot 36 to prevent unauthorized removal of the bicycle 10 from the rack 12.

In another embodiment of this invention the lockable securing device 17 can be provided as a solid body 22a having outwardly extending arms 23a forming a slot 36a. Transversely aligned apertures 38 are provided through the arms 23a near their outer ends. A suitable lock 39 having elongated legs can be inserted through the aligned apertures 38 to secure an attachment member 16 within the slot 36a. It is to be understood that any type of locking device can be provided for use with this invention for releasably securing any one of the attachment members 16 with the lockable securing device 17.

While a secure locking device for bicycles has been shown and described in detail, it is obvious that this invention is not to be considered as being limited to the exact form disclosed and that changes in detail and construction may be made therein within the scope of the invention without departing from the spirit thereof.

Having thus set forth and disclosed the nature of this invention, what is claimed is:

1. A bicycle securing device comprising
   a. a bicycle support means having a single elongated member and a pair of upright support legs located at each end of said elongated member to hold said elongated member at a predetermined height above the ground,
   b. said elongated member having a plurality of attaching means suspended downwardly therefrom, said attaching means being longitudinally spaced along the length of said elongated member,
   c. means for securing a bicycle to said support means, said securing means including a body having a pair of outwardly extending arms spaced from each other, said body being fixedly attached to a portion of the frame of a bicycle to be secured so that spaced arms may receive one of the attachment means of said bicycle support means, and
   d. locking means for releasably enclosing said attachment means within said spaced arms whereby said bicycle can be secured to said support means to prevent unauthorized removal.

2. A bicycle securing device as defined in claim 1 wherein
   said support attachment means are formed as individual U-shaped rods having parallel legs spaced the width of said elongated support member and the end of each leg of each rod is permanently affixed to opposite sides of said support member so as to form a closed loop.

3. A bicycle securing device as defined in claim 2 wherein
   the length of the legs of said U-shaped rods and the predetermined height of said elongated support member above the ground are arranged to accommodate the securing of bicycles of various sizes.

4. A bicycle securing device as defined in claim 1 wherein
   the spaced arms of said body include aligned transverse apertures arranged near the outer ends of said arms, and
   said locking means has a closable elongated loop, one leg of which can be passed through said aligned apertures for securing a support attachment means within the spaced arms.

5. A bicycle securing device as defined in claim 1 wherein
   said locking means is mounted within said body means and includes a lockable cylinder having an L-shaped latch attached thereto and arranged for rotatable movement whereby the outer portion of said latch can be lockably positioned to secure a support attachment means positioned between said spaced body arms.

6. A bicycle securing device as defined in claim 1 wherein
said body is attached to the front wheel bearing housing of the frame of said bicycle and is arranged so that said spaced arms extend forwardly and beyond said housing.

7. A bicycle securing device as defined in claim 6 wherein
said body means and said bearing housing are formed as an integral one-piece unit.

8. A bicycle securing device as defined in claim 6 wherein
said body means is attached by welding to the said bearing housing.

9. A bicycle securing device as defined in claim 6 wherein
said body means includes a strap device for surrounding said bearing housing and a means mounted within said body for tightening said strap around said housing for attaching of the body to said housing.

10. A bicycle securing assembly as defined in claim 9 wherein
said tightening means is positioned at the base of said spaced arms whereby the tightening means cannot be loosened when a support attachment means is secured between said spaced arms.

11. A bicycle lock for securing a bicycle having a frame including a front wheel bearing housing to a thin anchored object comprising:
a. a body having a pair of outwardly extending, rigid, parallel arms spaced from each other, said spaced arms include aligned transverse apertures arranged near the outer ends of said arms, said body being fixedly attached to the front wheel bearing housing of the frame of said bicycle and arranged so that the spaced arms extend forwardly and substantially beyond said housing,
b. locking means for releasably enclosing said anchored object between said spaced rigid arms whereby said bicycle can be secured to prevent unauthorized removal.

12. A bicycle locking device as defined in claim 11 wherein:
said locking means has a closable elongated loop, one leg of which can be passed through said aligned apertures for securing the object within the spaced arms.

13. A bicycle locking device as defined in claim 11 wherein:
said locking means is mounted within said body means and includes a lockable cylinder having a latch including a curved end portion attached thereto and arranged for rotatable movement whereby the end portion of said latch can be lockably positioned to secure said object positioned between said spaced body arms.

14. A bicycle locking device as defined in claim 11 wherein;
said body means includes a strap device for surrounding the front wheel bearing housing of the frame of said bicycle and a means mounted within said body for tightening said strap around said housing for fixedly attaching the body to said housing.

15. A bicycle locking device as defined in claim 14 wherein:
said tightening means is positioned at the base of said spaced arms whereby the tightening means can not be loosened when the object is secured between the spaced arms.

16. A bicycle locking device as defined in claim 13 wherein:
said locking means is removably mounted within said body means, said lockable cylinder being arranged to extend through said aligned apertures to secure said anchored object positioned between said spaced arms, the curved end portion of the latch being arranged for rotatable movement around the longitudinal axis of the cylinder to releasably lock the cylinder in position between said arms.

17. A bicycle locking device as defined in claim 14 wherein:
said strap device is a rigid U-shaped member and the mounting means within said body includes a pair of bolts threaded into the ends of said member, said bolts having means to permit rotation in a tightening direction only to fixedly attach said body means to the bearing housing of the bicycle.

18. A bicycle lock for securing a bicycle having a frame including a front wheel bearing housing to a thin anchored object comprising:
a. a body means having a pair of outwardly extending rigid arms spaced from each other, said spaced arms include transverse aligned apertures arranged near the outer ends of said arms, said body means fixedly attached to the front wheel bearing housing of the frame of said bicycle and arranged so that the spaced arms extend forwardly and outwardly beyond said housing,
b. locking means for releasably closing the said anchored object between said spaced rigid arms whereby said bicycle can be secured to prevent unauthorized removal,
c. said locking means being removably mounted within said body means and includes a lockable cylinder extending through said aligned apertures to secure said anchored object positioned between said spaced arms, said lockable cylinder having a latch provided at its outer end and arranged for rotatable movement around the longitudinal axis of said cylinder whereby the latch can be rotatably positioned to secure the cylinder within said aligned apertures, and
d. said body means includes a rigid U-shaped member for surrounding the front wheel bearing housing of the frame of said bicycle and said body means further includes a pair of bolts threaded through said body means into the ends of said member, said bolts having means to permit rotation in a tightening direction only to fixedly attach said body means to the bearing housing of said bicycle.

* * * * *

UNITED STATES PATENT OFFICE
CERTIFICATE OF CORRECTION

Patent No. 3,841,119                     Dated  October 15, 1974

Inventor(s) Edward A. Kaufmann

It is certified that error appears in the above-identified patent and that said Letters Patent are hereby corrected as shown below:

Column 2, line 64, "be" should be -- by --.

Signed and sealed this 4th day of February 1975.

(SEAL)
Attest:

McCOY M. GIBSON JR.              C. MARSHALL DANN
Attesting Officer                Commissioner of Patents